United States Patent
Miyashita et al.

(10) Patent No.: US 9,200,721 B2
(45) Date of Patent: Dec. 1, 2015

(54) FLUID CONTROL VALVE

(75) Inventors: Michio Miyashita, Seto (JP); Yukie Nakamura, Kasugai (JP)

(73) Assignee: CKD CORPORATION, Komaki-shi (JP)

( * ) Notice: Subject to any disclaimer, the term of this patent is extended or adjusted under 35 U.S.C. 154(b) by 202 days.

(21) Appl. No.: 14/119,756

(22) PCT Filed: Jul. 17, 2012

(86) PCT No.: PCT/JP2012/068128
§ 371 (c)(1),
(2), (4) Date: Nov. 22, 2013

(87) PCT Pub. No.: WO2013/018539
PCT Pub. Date: Feb. 7, 2013

(65) Prior Publication Data
US 2014/0077109 A1 Mar. 20, 2014

(30) Foreign Application Priority Data
Jul. 29, 2011 (JP) ................................. 2011-167202

(51) Int. Cl.
*F16K 31/122* (2006.01)
*F16K 49/00* (2006.01)
(Continued)

(52) U.S. Cl.
CPC ................. *F16K 31/122* (2013.01); *F16K 7/12* (2013.01); *F16K 7/17* (2013.01); *F16K 49/005* (2013.01)

(58) Field of Classification Search
CPC ........... F16K 31/122; F16K 7/17; F16K 7/12; F16K 49/005
USPC ............ 251/331, 335.2, 366, 367, 77, 79, 80, 251/81, 111, 112
See application file for complete search history.

(56) References Cited

U.S. PATENT DOCUMENTS 3,604,460 A * 9/1971 Delrue ..................... 137/625.66
3,974,849 A * 8/1976 Dawson ....................... 137/221
(Continued)

FOREIGN PATENT DOCUMENTS

CN 200961722 Y 10/2007
CN 101097000 A 1/2008
(Continued)

OTHER PUBLICATIONS

Machine Translation jp 2006-011853a; Espacenet, Aug. 5, 2015, 12 pages.*

(Continued)

*Primary Examiner* — Kevin Murphy
*Assistant Examiner* — Daphne M Barry
(74) *Attorney, Agent, or Firm* — Oliff PLC

(57) ABSTRACT

In a fluid control valve, a valve part houses a diaphragm in a valve body including a valve seat, first and second ports, and a drive part includes a piston dividing a piston chamber in a cylinder body into first and second chambers, and a rubber sealing member attached to the outer peripheral surface of the piston. A constriction is provided between the piston chamber and the surface of the cylinder body contacting the valve body. The cylinder body is formed with an exhaust port communicating with the first chamber, an operation port communicating with the second chamber, and a purge port communicating with a fluid non-contact chamber. The piston is formed with a flow path which enables communication between the first chamber and the fluid non-contact chamber. Accordingly, a temperature increase of the drive part can be restricted, and degradation of internal parts can be prevented.

20 Claims, 9 Drawing Sheets

(51) Int. Cl.
  *F16K 7/12*     (2006.01)
  *F16K 7/17*     (2006.01)

(56) References Cited

U.S. PATENT DOCUMENTS 8,087,641 B2 *   1/2012   Masamura .................... 251/331
2008/0001110 A1   1/2008   Nagai

FOREIGN PATENT DOCUMENTS

| JP | A-1-182687 | 7/1989 |
| JP | U-2-76279 | 6/1990 |
| JP | U-5-62704 | 8/1993 |
| JP | A-6-50218 | 2/1994 |
| JP | A-2003-278943 | 10/2003 |
| JP | 2006-011853 a * | 6/2006 |
| JP | A-2007-321958 | 12/2007 |
| JP | A-2009-2442 | 1/2009 |
| JP | A-2010-242916 | 10/2010 |

OTHER PUBLICATIONS

International Search Report issued in International Patent Application No. PCT/JP2012/068128 dated Sep. 18, 2012.
Dec. 17, 2014 Office Action issued in Chinese Application No. 201280037131.6.

* cited by examiner

FLUID CONTROL VALVE

CROSS-REFERENCE TO RELATED APPLICATIONS

This is a US national phase application based on the PCT International Patent Application No. PCT/JP2012/068128 filed on Jul. 17, 2012, and claiming the priority of Japanese Patent Application No. 2011-167202, filed on Jul. 29, 2011, whose entire disclosures are herewith incorporated by reference.

TECHNICAL FIELD

The present invention relates to a fluid control valve for controlling fluid.

BACKGROUND ART

A fluid control valve for controlling fluid is heretofore used in for example a cleaning step of a semiconductor manufacturing device. In the cleaning step, when an application agent applied to wafers is to be removed, an amount of a cleaning fluid such as acid to be supplied is controlled by a fluid control valve. This fluid control valve includes a fluid contact surface made of corrosion-resistant material to control even high corrosive fluid.

FIG. 7 is a cross sectional view of a conventional fluid control valve 101. FIG. 8 is a view showing a fixing structure of the fluid control valve 101 shown in FIG. 7. FIG. 9 is a top view of the fluid control valve 101 shown in FIG. 7. The conventional fluid control valve 101 includes a valve section 102 and a drive section 103 and will be attached to any device through a mounting plate 110. The valve section 102 includes a resin valve body 120 having a first port 121 and a second port 122 communicating with each other through a valve chamber 123. This valve chamber 123 is provided with a valve seat face 124 around an opening communicating with the first port 121. A diaphragm 125 molded of resin includes a valve element portion 125a movable into or out of contact with the valve seat face 124, a thin web portion 125b formed to be elastically deformable, and a peripheral portion 125c clamped between the valve section 102 and the drive section 103.

The drive section 103 is formed with a piston chamber 134 between a cylinder 131 and a cover 132. In the piston chamber 134, a piston 135 is housed. This piston 135 is attached with a rubber sealing member 141 placed to slide in contact with an inner wall of the piston chamber 134 and to hermetically divide the piston chamber 134 into a first chamber 134a and a second chamber 134b. A piston rod 136 protrudes from the drive section 103 into the valve section 102 and is connected to the valve element portion 125a of the diaphragm 125. On the outer periphery of the piston rod 136, a rubber sealing member 140 is mounted to slide in contact with the cylinder 131 to prevent cleaning fluid permeated and vaporized through the web portion 125b from leaking from the valve section 102 to the drive section 103. In the first chamber 134a, a spring 139 is placed in a compressed state. The first chamber 134a communicates with an air exhaust port 132a. The second chamber 134b communicates with an operation port 131a through which operation air will be supplied.

The above fluid control valve 101 is configured such that the piston 135 is moved up and down in the figure according to the balance between the elastic force of the spring 139 and the pressure of the operation air supplied to the second chamber 134b, thus moving the diaphragm 125 into or out of contact with the valve seat face 124, thereby controlling a cleaning fluid allowing to flow between the first port 121 and the second port 122.

In the above conventional fluid control valve 101, parts or members excepting the spring 139 and the sealing members 140 and 141 are made of resin in order to ensure corrosion resistance. In the cleaning step, the fluid control valve 101 controls a cleaning fluid of 160° C., for example. As shown in FIG. 8, the valve section 102 and the drive section 103 are fastened to each other by screwing fixing screws 146 and 147 from above and below in nut members 148 formed by insert in the cylinder 131 to prevent loosening of their connection due to creep deformation of the parts or members. As shown in FIGS. 8 and 9, the fixing screws 146 and 147 are covered by resin caps 151 and 152 respectively to avoid exposure to corrosive atmosphere (see for example Patent Documents 1 and 2).

RELATED ART DOCUMENTS

Patent Documents

Patent Document 1: JP 2010-242916A
Patent Document 2: JP 2009-002442A

SUMMARY OF INVENTION

Problems to be Solved by the Invention

However, recently, the temperature of the cleaning fluid to be controlled by the fluid control valve 101 may be set to from 200° C. to 250° C. This is because a hot cleaning fluid can shorten the time required for a cleaning step to from about one third to half. In this case, in the fluid control valve 101, the heat of the cleaning fluid is transferred from the valve body 120 to the valve seat face 124, the valve element portion 125a of the diaphragm 125, the piston rod 136, the piston 135, and the sealing members 140 and 141. Further, the heat of the cleaning fluid is also transferred from the valve body 120 to the peripheral portion 125c of the diaphragm 125, the sealing member 145, the cylinder 131, the cover 132, and the sealing members 140 and 141. The sealing members 140 and 141 are each made of rubber and hence low in upper temperature limit. Accordingly, if the heat of the cleaning fluid is transferred to the sealing members 140 and 141 and they are thereby heated up to about 200° C., they may lose sealing force due to degradation such as deformation and melting. The sealing member 141 may be melted by the heat, sticking to the inner wall of the cylinder 131, thus disturbing operations of the piston 135. The piston 135, piston rod 136, and sealing members 140 and 141, which are housed in the cylinder 131, are hard to release the heat to outside and thus they are apt to cause the above problems.

The present invention has been made to solve the above problems and has a purpose to provide a fluid control valve configured to restrain a temperature rise of a drive section and prevent degradation of internal parts or members.

Means of Solving the Problems

To achieve the above purpose, one aspect of the invention provides the following configurations.

(1) In a fluid control valve including a valve section for controlling fluid and a drive section for imparting a drive force to the valve section, the valve section includes: a valve body formed with a first port and a second port; a valve seat provided between the first port and the second port; and a diaphragm movable into or out of contact with the valve seat, the drive section includes: a cylinder body provided with a piston chamber and clamping the diaphragm with respect to the valve body; a piston slidably mounted in the piston chamber to divide the piston chamber into a first chamber and a second chamber and connected to the diaphragm; and a rubber sealing member mounted on sliding-contact surfaces of the piston and the cylinder body, the cylinder body includes a constriction to reduce a cross sectional area of a portion between the piston chamber and a surface contacting the valve body, the cylinder body is formed with an air exhaust port communicating with the first chamber, an operation port communicating with the second chamber to supply operation air to the second chamber, and a purge port communicating with a fluid non-contact chamber on the diaphragm to supply purge gas to the fluid non-contact chamber, and the piston is formed with a flow passage to communicate the fluid non-contact chamber and the first chamber.

(2) In the above configuration (1), preferably, the valve body and the diaphragm are made of resin, and the cylinder body is made of metal.

(3) The above configuration (1) or (2), preferably, further includes: a plurality of fixing screws inserted through the cylinder body; and a circular-arc shaped fixing plate provided with female screw holes arranged evenly in a circumferential direction, in which the plurality of fixing screws are fastened, wherein the fixing plate is placed on an outer circumference of the valve body and the plurality of fixing screws inserted through the cylinder body are fastened with the female screw holes, and the valve body and the cylinder body are clamped by the fixing plate and the fixing screw.

(4) In the above configuration (3), preferably, the fixing plate includes a press portion protruding toward a center, the valve body is formed with a mounting groove in which the press portion is placed, and the mounting groove is formed so that the press portion is placed below a peripheral portion of the diaphragm.

(5) In the above configuration (3) or (4), preferably, the valve body is formed with rotation-lock holes in positions corresponding to the female screw holes, and leading ends of the fixing screws are inserted in the rotation-lock holes.

(6) In one of the above configurations (3) to (5), preferably, a portion of the cylinder body clamped by the fixing plate and the fixing screws has a circular columnar shape, and a portion of the valve body clamped by the fixing plate and the fixing screws has a circular columnar shape or a regular polygonal or more polygonal shape.

(7) In one of the above configurations (4) to (6), preferably, the valve body has a surface contacting with the cylinder body and having an area smaller than a projected area of a lower surface of the cylinder body, and the mounting groove is provided so that a gap is formed between the fixing plate and at least one of the cylinder body and the valve body while at least the press portion of the fixing plate is placed in contact with the valve body.

(8) The above configuration (7), preferably, further includes a heat insulation member placed in the gap.

Effects of the Invention

In the aforementioned fluid control valve, if a fluid of e.g. 200° C. is supplied to the valve section, the valve body is heated by heat transfer from the temperature of the fluid. The heat will be transferred from the valve body to the cylinder body. However, the cylinder body is provided with the constriction to provide a reduced cross sectional area of the portion between the piston chamber and the surface contacting with the valve body. Therefore, the heat is less likely to transfer from the constricted portion having a small cross sectional area to the surroundings of the piston chamber. The rubber sealing member attached to the sliding-contact surfaces of the piston and the cylinder body is less heated. The purge gas supplied to the purge port passes from the fluid non-contact chamber to an internal passage of the piston and flows in the first chamber, and then is discharged through the air exhaust port. Accordingly, even if the heat of the valve body is transferred to the piston via the diaphragm, the purge gas cools the inside of the piston, preventing a temperature rise of the rubber sealing member mounted on the sliding-contact surfaces of the piston and the cylinder body. In this manner, the fluid control valve can restrain a temperature rise of the drive section, so that the internal parts or members of the cylinder body are hard to degrade.

The above fluid control valve in which the valve body and the diaphragm are made of resin and the cylinder body is made of metal can enhance heat resistance and strength as compared with a case where a cylinder body is made of resin.

In the above fluid control valve, the fixing plate is placed on the outer circumference of the valve body and the plurality of fixing screws inserted through the cylinder body are fastened with the female screw holes, and the valve body and the cylinder body are clamped by the fixing plate and the fixing screw. Thus, an amount of clamping the valve body and the cylinder body by the fixing screws and the fixing plate is small. Accordingly, even if the valve body is creep-deformed to control a hot fluid of approximately 200° C., the fixing screws are less likely to be loosened. In the above fluid control valve, even if the valve body is creep-deformed, the holding force to retain the diaphragm is not likely decrease and thus outward leakage of fluid is hard to occur.

In the above fluid control valve, the fixing plate includes the press portion protruding toward the center. The valve body is formed with the mounting groove in which the press portion is placed. The mounting groove is formed so that the press portion is placed below the peripheral portion of the diaphragm. Accordingly, when the valve body and cylinder body are clamped by the fixing plate and the fixing screws, the press portion pushes the valve body against the cylinder body from below the peripheral portion of the diaphragm, thereby compressing the peripheral portion of the diaphragm to achieve sealing. This can prevent the fluid from leaking outside.

In the valve body of the above fluid control valve, the valve body is formed with the rotation-lock holes in the positions corresponding to the female screw holes, and the leading ends of the fixing screws are inserted in the rotation-lock holes. Accordingly, if the cylinder body attempts to rotate with respect to the valve body due to vibration of surrounding environment and others, this rotation can be inhibited. The above fluid control valve can therefore hold the cylinder body against rotation with respect to the valve body and thus the holding force to retain the diaphragm is not decreased.

In the above fluid control valve, the portion of the cylinder body clamped by the fixing plate has a circular columnar shape and the portion of the valve body clamped by the fixing plate has a circular columnar shape or a regular polygonal or more polygonal shape. Thus, the cylinder body and the valve body are almost uniform in wall thickness around each fixing screw. In the fluid control valve, accordingly, even if the valve body is creep-deformed, there is no stress concentrated at around each fixing screw.

In the above fluid control valve, the area of a surface of the valve body contacting with the cylinder body is smaller than the projected area of the lower surface of the cylinder body.

The mounting groove of the valve body is provided to form the gap between the fixing plate and at least one of the cylinder body and the valve body while at least the press portion of the fixing plate is in contact with the valve body. Such a fluid control valve is provided with an air layer providing low heat-transfer efficiency between the valve body and the cylinder body. In addition, the heat is transferred from the valve body to the cylinder body by the area smaller than the projected area of the cylinder body. Accordingly, the temperature of the cylinder body is less likely to increase by the heat of the valve body.

In the above fluid control valve, the heat insulation member is placed in the gap formed between the fixing plate and at least of the valve body and the cylinder body. Accordingly, the heat is less likely to transfer from the valve body to the cylinder body.

MODE FOR CARRYING OUT THE INVENTION

Figure 1:
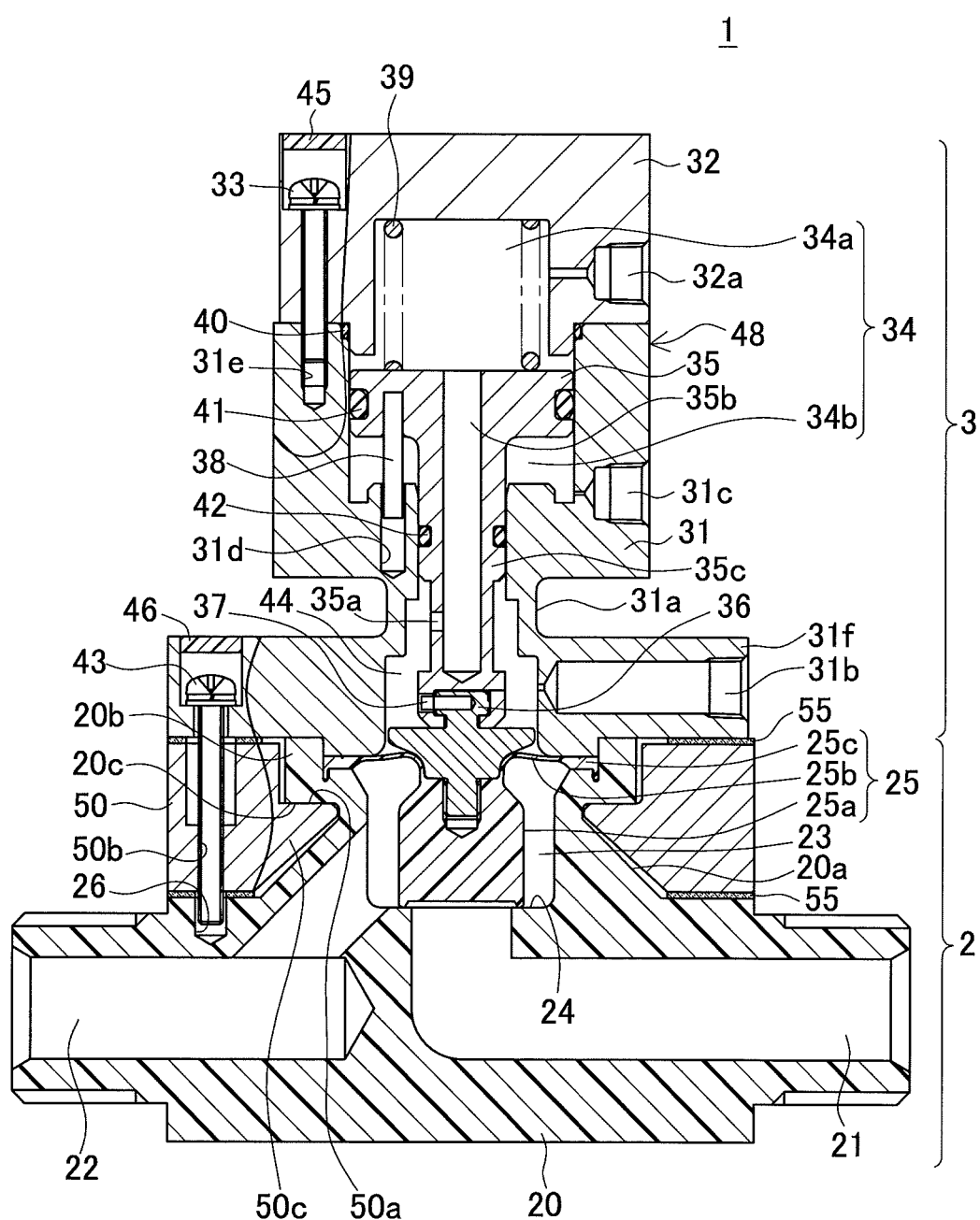
FIG. 1 is a cross sectional view of a fluid control valve of an embodiment according to the invention.
Figure 2:
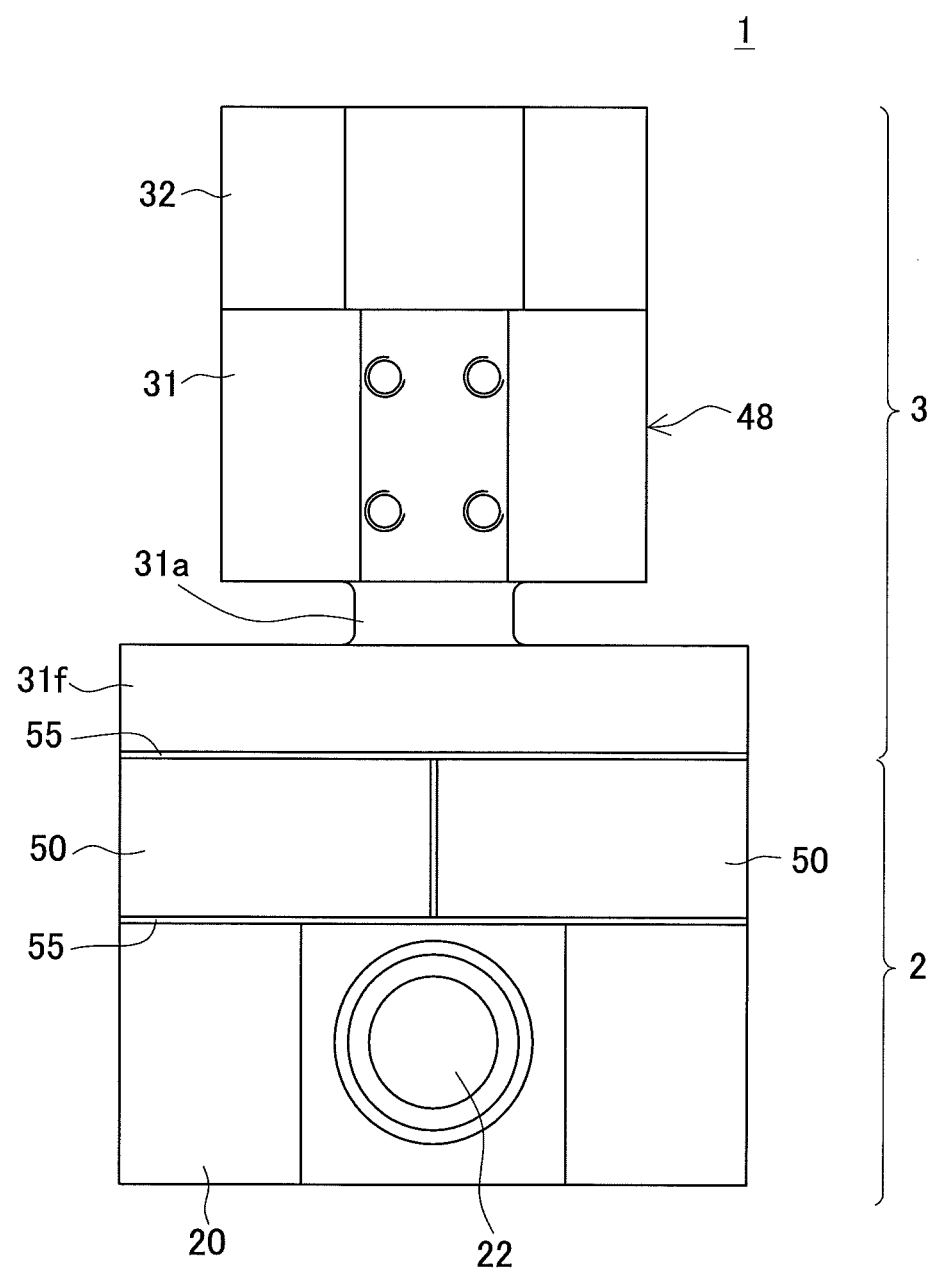
FIG. 2 is a left side view of the fluid control valve shown in FIG. 1.
Figure 3:
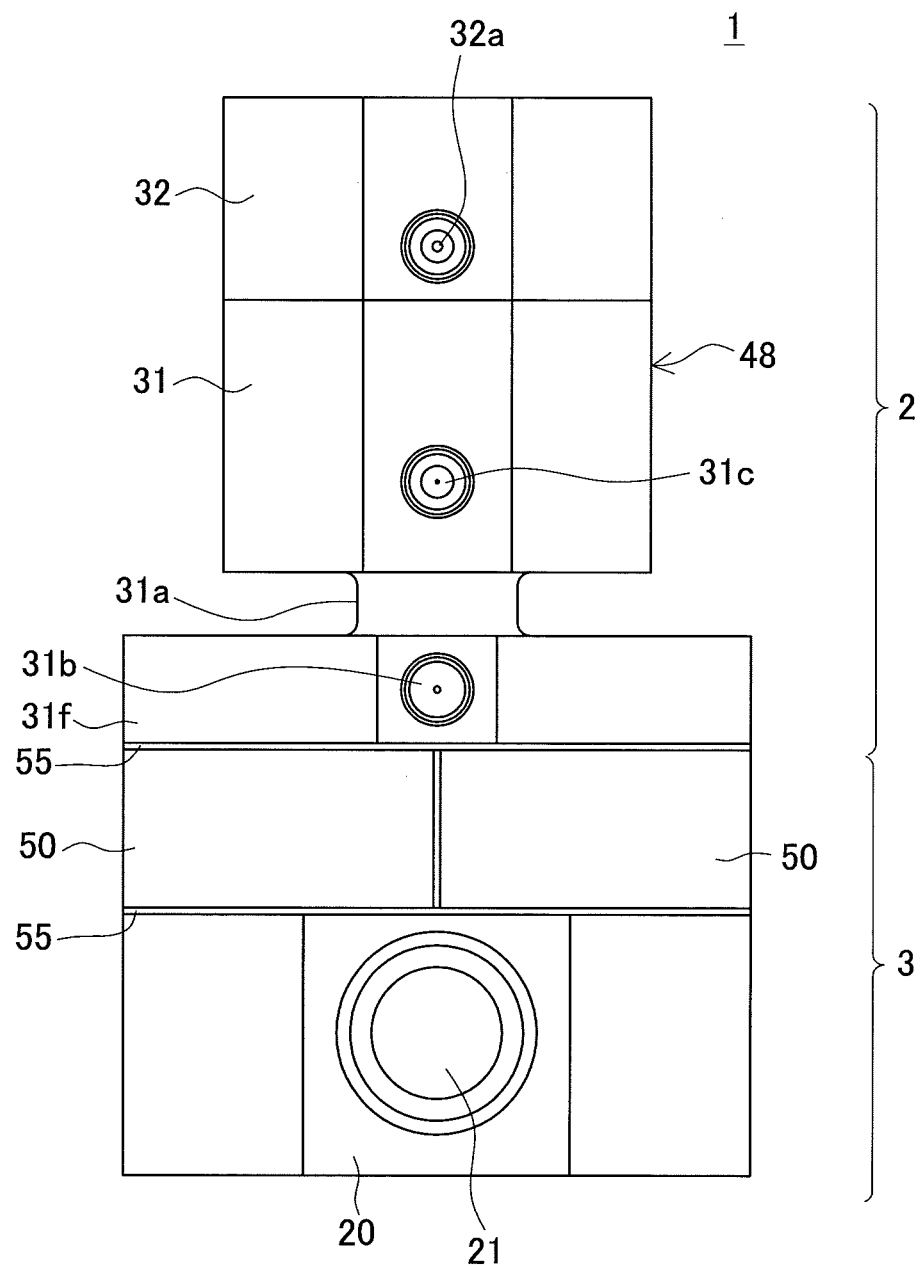
FIG. 3 is a right side view of the fluid control valve shown in FIG. 1.
Figure 4:
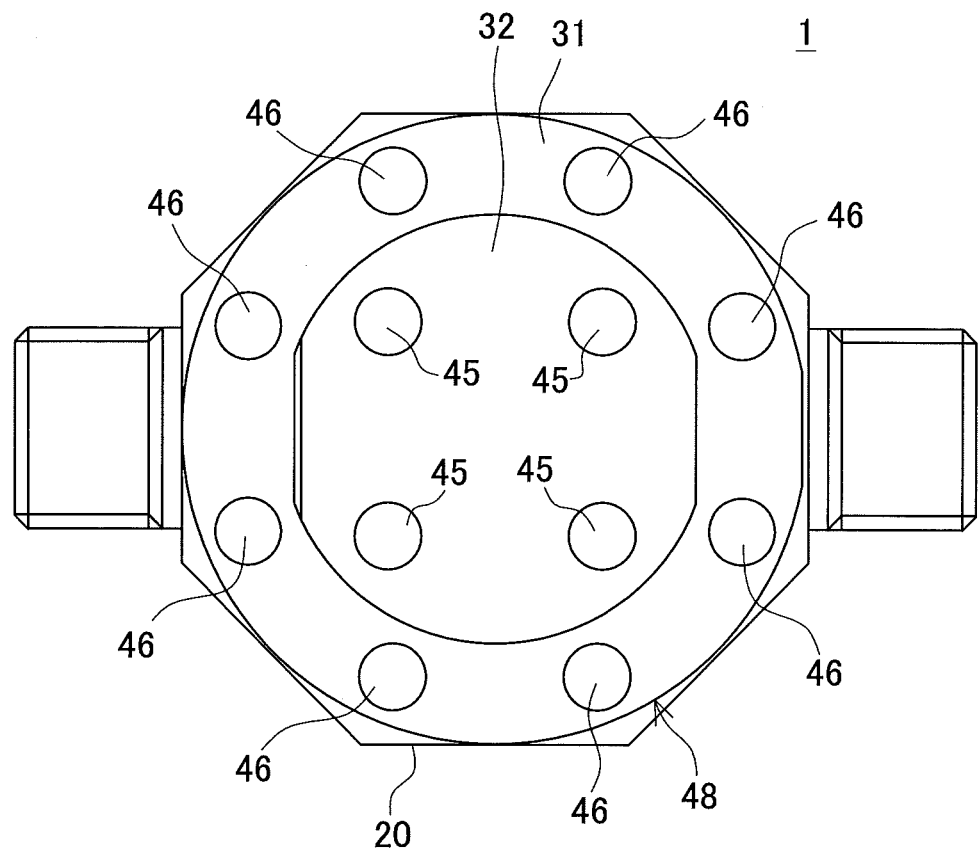
FIG. 4 is a top view of the fluid control valve shown in FIG. 1.
Figure 5:
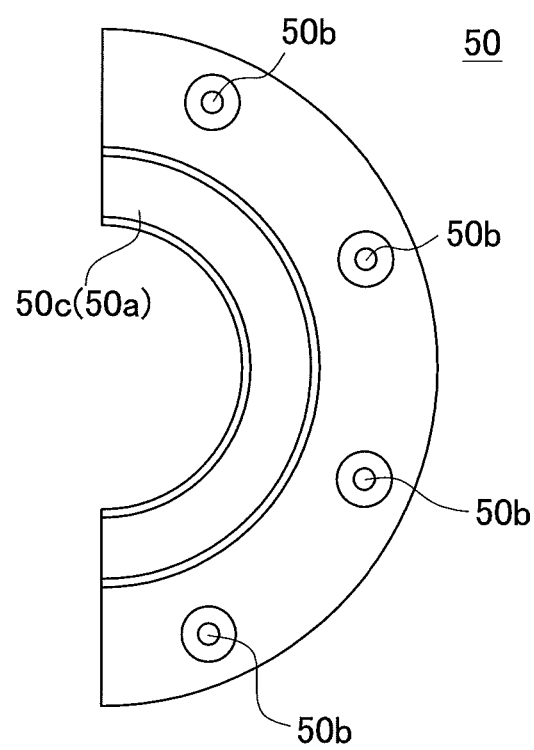
FIG. 5 is a plan view of a fixing plate shown in FIG. 1.
Figure 6:
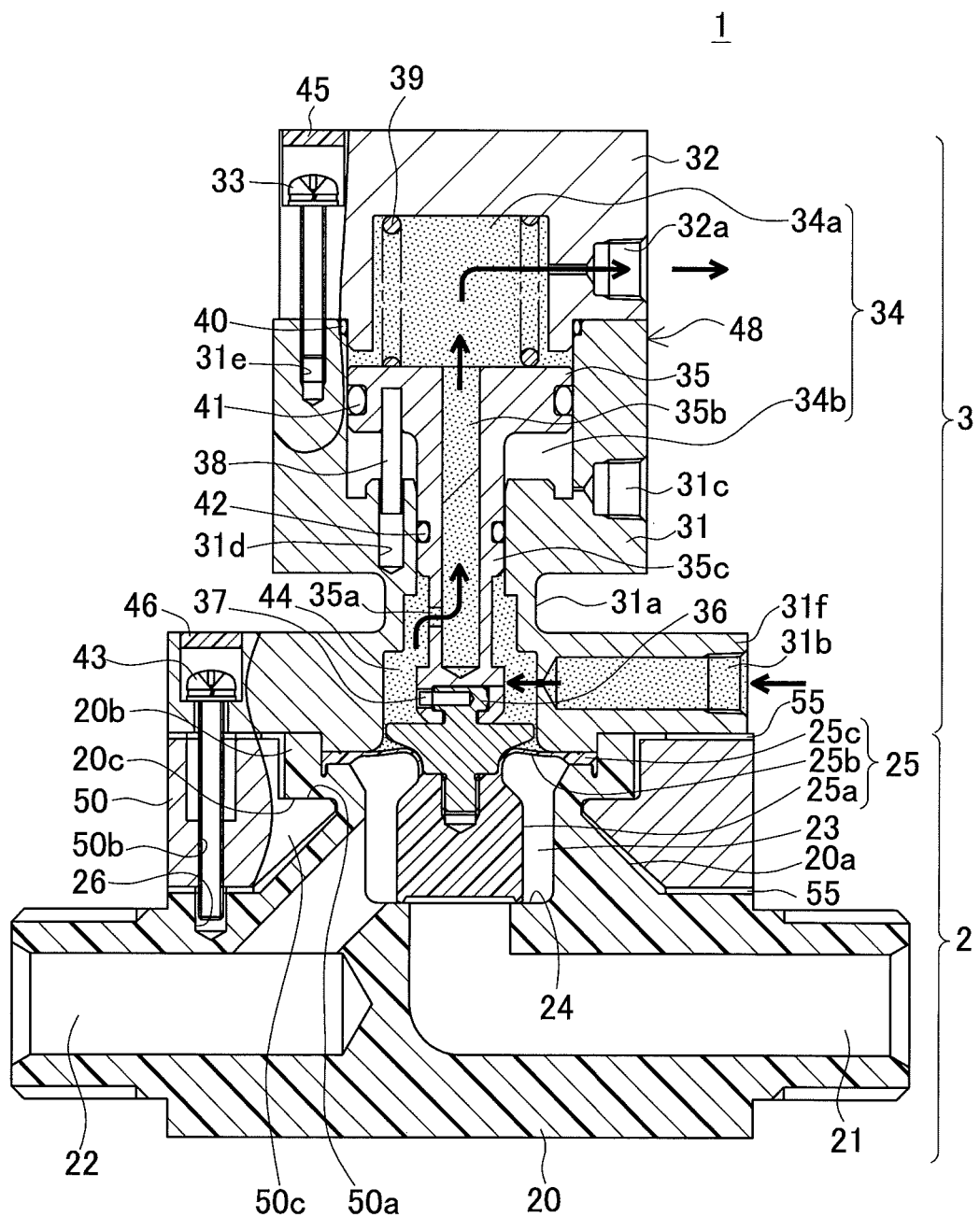
FIG. 6 is a view showing purge air flow in the fluid control valve shown in FIG. 1.

A detailed description of an embodiment of the present invention will now be given referring to the accompanying drawings.
<Configuration of Fluid Control Valve>
FIG. 1 is a cross sectional view of a fluid control valve 1 in the present embodiment according to the invention. FIG. 2 is a left side view of the fluid control valve shown in FIG. 1. FIG. 3 is a right side view of the fluid control valve shown in FIG. 1. FIG. 4 is a top view of the fluid control valve 1 shown in FIG. 1. FIG. 5 is a plan view of a fixing plate 50 shown in FIG. 1. FIG. 6 is a view showing purge air flow in the fluid control valve shown in FIG. 1. It is to be noted that a wavy line near the fixing screw 43 shown in FIGS. 1 and 6 represents that the cross section of a portion around the screw 43 is different from those of other portions.

As shown in FIGS. 1, 2, and 3, the fluid control valve 1 includes a valve section 2 and a drive section 3 integrally coupled to each other by use of a pair of fixing plates 50, 50 and fixing screws 43. This fixing configuration will be explained later.

The valve section 2 shown in FIG. 1 includes a valve body 20 made of high corrosion-resistant and high heat-resistant resin such as PTFE (polytetrafluoroethylene). The valve body 20 is formed with a first port 21 and a second port 22. The first port 21 and the second port 22 communicate with a valve chamber 23. An inner wall of the valve chamber 23 is formed with a valve seat face 24 (one example of a valve seat) around an opening communicating with the first port 21. Thus, the first port 21 and the second port 22 communicate with each other via the valve seat face 24.

A diaphragm 25 shown in FIG. 1 is made of high corrosion-resistant and high heat-resistant resin such as PTFE (polytetrafluoroethylene). This diaphragm 25 includes a columnar-shaped valve element portion 25a which will be moved into or out of contact with the valve seat face 24, a thin web portion 25b formed to protrude outward from the outer periphery of the valve element portion 25a and to be elastically deformable, and a thick peripheral portion 25c provided along the outer edge of the web portion 25b. The diaphragm 25 is configured such that the peripheral portion 25c is clamped or sandwiched between the valve section 2 and the drive section 3 to prevent outward leakage of cleaning fluid.

Most parts or members of the drive section 3 excepting the sealing members 40, 41, and 42 shown in FIG. 1 are made of heat-resistant metal such as SUS and aluminum. The drive section 3 includes an air operated structure in which a piston 35 is moved according to pressure changes of the operation air to impart a drive force to the valve element portion 25a of the diaphragm 25.

To be concrete, the drive section 3 includes a cylinder body 48 consisting of a cylinder 31 and a cover 32. These cylinder 31 and cover 32 are connected to each other by screwing fixing screws 33 inserted through the cover 32 into female screw holes 31e of the cylinder 31. The fixing screws 33 are covered by rubber closing caps 45 to avoid exposure to corrosive atmosphere. Between the cover 32 and the cylinder 31, the rubber sealing member 40 is placed to prevent air leakage.

Between the cover 32 and the cylinder 31, a piston chamber 34 is generated. The piston 35 is mounted to be slidable in the piston chamber 34 and divide the piston chamber 34 into a first chamber 34a and a second chamber 34b. The sealing member 41 made of rubber is mounted on an outer peripheral surface of the piston 35 slidably contacting with the inner wall of the piston chamber 34. The piston 35 is formed integrally coaxially with a piston rod 35c. This piston rod 35c protrudes from the cylinder 31 toward the valve body 20 and is connected to the valve element portion 25a of the diaphragm 25 through a backup member 36. The backup member 36 serves to support the web portion 25b so that even if fluid pressure of the cleaning fluid acts on the web portion 25b, the stress does not concentrate on a proximal end of the web portion 25b continuous to the valve element portion 25a. The backup member 36 is retained by the piston rod 35c with a stopper pin 37.

The sealing member 42 made of rubber is placed on an outer peripheral surface of the piston rod 35c slidably contacting with the inner peripheral surface of the cylinder 31. Accordingly, the second chamber 34b is hermetically separated from a fluid non-contact chamber 44, so that the cleaning fluid passing through the web portion 25b of the diaphragm 25 and vaporizing is not leaked toward the drive section 3.

The spring 39 is placed in a compressed state in the first chamber 34a to continuously urge the piston 35 toward the valve body 20 (downward in the figure). A guide pin 38 in the piston 35 is inserted in a guide hole 31d of the cylinder 31, so that the piston 35 is stably movable upward and downward in the figure.

The cylinder 31 is provided with a constriction 31a. This constriction 31a is provided to have a thin wall thickness to reduce the cross sectional area of a portion between the piston chamber 34 and the surface contacting with the valve body 20. In the cylinder 31, the constriction 31a is formed so that a cross sectional area of a portion corresponding to the constriction 31a is smaller in a range of 50% to 90% inclusive with respect to a portion corresponding to the piston chamber 34. The cylinder body 48 includes the operation port 31c and an air purge port 31b formed in the cylinder 31. The operation port 31c is formed to communicate with the second chamber 34b.

The operation port 31c is connected to a line for supplying high-pressure operation air supplied from an operation air supply source. On the other hand, the air purge port 31b is formed to communicate with the fluid non-contact chamber 44. The air purge port 31b is connected to a line including a regulator for reducing the pressure of the high-pressure operation air supplied from the operation air supply source. Hereinafter, the operation air to be supplied to the air purge port 31b and to be lower in pressure than the operation air supplied to the operation port 31c is referred to as "purge air". As above, the operation air to be supplied to the operation port 31c and the purge air to be supplied to the air purge port 31b are the same fluid to be supplied from the operation air supply source but different in pressure. The reason why the high-pressure operation air supplied from the operation air supply source is reduced in pressure and supplied as the purge air to the purge port 31b is that, if the high-pressure operation air supplied from the operation air supply source is directly supplied to the air purge port 31b, high pressure acts on the web portion 25b of the diaphragm 25, which may result in deformation of the web portion 25b of the diaphragm 25. Furthermore, the reason why the pressure of the purge air to be supplied to the air purge port 31b may be lower than the pressure of the operation air to be supplied to the operation port 31c is that the purge air supplied to the air purge port 31b needs only to remove the heat and cool the piston 35 and others.

The piston rod 35c is formed with a communication passage 35a and a main purge passage 35b. The communication passage 35a is formed to open from a side surface of the piston rod 35c to the center thereof. The main purge passage 35b is formed to extend from an upper end face of the piston 35 to communicate with the communication passage 35a. Therefore, the fluid non-contact chamber 44 communicates with the first chamber 34a through the communication passage 35a and the main purge passage 35b. The first chamber 34a communicates with an air exhaust port 32a formed in the cover 32. The exhaust port 32a may be communicated with outside air or connected to a circuit for collecting exhaust gas.

Next, the structure for fixing the valve section 2 and the drive section 3 will be explained. The fixing plates 50, one shown in FIG. 5, are made of heat-resistant metal such as SUS and aluminum and each formed into a semi-circular shape. The inner peripheral surface of each fixing plate 50 is provided with a press portion 50c protruding toward the center. Each fixing plate 50 is configured as shown in FIG. 1 such that a press surface 50a is formed perpendicular to an axis line of the fixing plates 50 to provide a vertical cross section of a nearly L-like shape. Each fixing plate 50 is formed, outside the press surface 50a, with a plurality of female screw holes 50b each extending in the axis line. The female screw holes 50b are formed in each fixing plate 50 so that the holes 50b are circumferentially equally arranged when the pair of fixing plates 50 are mounted in the fluid control valve 1.

As shown in FIG. 4, the cylinder body 48 (the cover 32 and the cylinder 31) of the drive section 3 is formed in a circular columnar shape. As shown in FIG. 1, a lower end portion of the cylinder 31 contacting with the valve body 20 has a circular disk-like flange shape (hereinafter, this lower end portion is referred to as a "flange 31f"). As shown in FIGS. 1 and 4, the flange 31f is formed with through holes in which the fixing screws 43 are inserted. The through holes are arranged evenly in a circumferential direction. The cylinder 31 is designed such that the projected area of the flange 31f is larger than the projected area of a part formed with the piston chamber 34 and thus the insertion distance of each fixing screw 43 in the cylinder 31 is set short.

As shown in FIG. 1, furthermore, the valve body 20 is provided with an annular upper end portion 20b outside a groove for holding the peripheral portion 25c of the diaphragm 25. The upper end portion 20b is formed to be smaller than the flange 31f to allow the fixing screws 43 inserted in the flange 31f to be fastened with female screw holes 50b of the fixing plates 50. The valve body 20 is formed with an annular mounting groove 20a in which the press portions 50c of the fixing plates 50 are inserted. The mounting groove 20a includes a pressure-receiving surface 20c formed perpendicular to the axis line of the valve body 20. The mounting groove 20a is formed so that the press portions 50c of the fixing plates 50 are placed below the peripheral portion 25c of the diaphragm 25. The mounting groove 20a is also formed so that only the press surfaces 50a of the fixing plates 50 are placed in contact with the pressure-receiving surface 20c, thereby generating gaps between the upper surfaces of the fixing plates 50 and the flange 31f, between the lower surfaces of the fixing plates 50 and the valve body 20, and between the inner peripheral surfaces of the fixing plates 50 and the outer peripheral surface of the upper end portion 20b. In the gap formed between the upper surfaces of the fixing plates 50 and the flange 31f and the gap formed between the lower surfaces of the fixing plates 50 and the valve body 20, heat-insulation members 55 are respectively placed so that the fixing plates 50, the valve body 20, and the cylinder body 48 are less likely to transfer heat to each other.

The valve body 20 is formed with rotation-lock holes 26 in corresponding positions to the female screw holes 50b of the fixing plates 50 so that the leading ends of the fixing screws 43 are each inserted in corresponding one. In a case of the valve body 20 having a regular polygonal shape as shown in FIG. 4, the rotation-lock holes 26 are desired to be placed on lines each connecting the center of the valve body 20 to each apex of the outer shape. This is to make the wall thickness of the valve body 20 around each fixing screw 43 uniform. In the present embodiment, the outer shape of the valve body 20 is regular octagonal and thus eight rotation-lock holes 26 are provided evenly in a circumferential direction of the valve body 20.

The above cylinder body 48 and valve body 20 are assembled in such a way that the flange 31f of the cylinder body 48 is placed into contact with the valve body 20 and the pair of fixing plates 50 are engaged in the mounting groove 20a. Then, the fixing screws 43 are inserted through the flange 31f and fastened with the female screw holes 50b of the fixing plates 50. At that time, the pair of fixing plates 50 press the press surfaces 50a against the pressure-receiving surface 20c, thereby pressing the valve body 20 to the cylinder body 48 from below the peripheral portion 25c of the diaphragm 25. Thereby, the flange 31f and the valve body 20 are clamped and fixed by the pair of fixing plates 50, compressing the peripheral portion 25c of the diaphragm 25 to provide sealing. In this state, the leading end portion of each fixing screw 43 protrudes from the female screw hole 50b and is inserted in the rotation-lock hole 26. Since the fixing screws 43 are inserted in the rotation-lock holes 26, the cylinder body 48 is prevented from rotating with respect to the valve body 20.

It is to be noted that the number of fixing screws 43 is preferably set to six or more in order to achieve uniform stress distribution generated in the cylinder 31 and the valve body 20. Accordingly, the outer shape of the valve body 20 is desired to be hexagonal or more polygonal. In the present embodiment, the outer shape of the valve body 20 is regular octagonal and eight fixing screws 43 are used to fix the cylinder body 48 and the valve body 20.

The operations of the above fluid control valve 1 will be explained. In the fluid control valve 1, while the operation air is not supplied to the second chamber 34*b*, the piston 35 is pressed down by the spring force of the spring 39, placing the valve element portion 25*a* of the diaphragm 25 in contact with the valve seat face 24. In this case, communication between the first port 21 and the second port 22 is blocked, not allowing the cleaning fluid to flow.

In the fluid control valve 1, while the operation air is supplied to the second chamber 34*b*, when the internal pressure of the second chamber 34*b* becomes beyond the spring force of the spring 39, the piston 35 moves up against the spring 39, thereby separating the valve element portion 25*a* of the diaphragm 25 from the valve seat face 24. Accordingly, communication between the first port 21 and the second port 22 is allowed and the cleaning fluid is output at a flow rate controlled according to a valve opening.

Meanwhile, when the cleaning fluid under control has been heated to for example 200° C. to 250° C., the valve body 20 is heated. This heat is transferred from the valve body 20 to the cylinder 31. However, the cylinder 31 has the constriction 31*a* whereby the volume is small between the piston chamber 34 and the flange 31*f*. Accordingly, the heat transferred from the valve body 20 to the cylinder 31 is transmitted toward the piston chamber 34 through the portion having a cross sectional area made small by the constriction 31*a*. Thus, the temperature of the cylinder 31 around the piston chamber 34 does not so increase as the flange 31*f*, so that the sealing members 40, 41, and 42 are less heated.

In the fluid control valve 1, furthermore, the purge air lower in pressure than the operation air to be supplied to the operation port 31*c* is continuously supplied to the air purge port 31*b* as shown in FIG. 6. The purge air flows from the air purge port 31*b* to the first chamber 34*a* via the fluid non-contact chamber 44, the communication passage 35*a* and the main purge passage 35*b* of the piston rod 35*c*, and then discharged out through the air exhaust port 32*a*. The purge air is supplied at room temperature, which is lower than the temperature of the cleaning fluid. Accordingly, the purge air flows while removing the heat from the cylinder 31, piston rod 35*c*, piston 35, and fluid non-contact chamber 44, thereby cooling the internal parts or members of the cylinder body 48 and suppressing a temperature rise of the drive section 3.

Further, the valve body 20 is connected to the cylinder body 48 while the upper end portion 20*b* provided with a smaller diameter than the flange 31*f* is placed in surface contact with the flange 31*f*. The pair of fixing plates 50 fix the valve body 20 and the cylinder body 48 while only the press surfaces 50*a* are placed in contact with the pressure-receiving surface 20*c* of the valve body 20 and other portions are not in contact with the valve body 20 and the cylinder body 48. Accordingly, the heat of the valve body 20 will be transferred only from the upper end portion 20*b* to the flange 31*f* of the cylinder body 48. The cylinder body 48 is therefore less heated by the valve body 20.

In addition, since the heat insulation members 55 function to reduce heat transfer between the cylinder body 48 and the fixing plates 50, the cylinder body 48 is less heated by the heat of the valve body 20.

In the fluid control valve 1, consequently, the temperature rise of the cylinder body 48 is restrained. Further, the sealing members 40, 41, and 42 will not be melted, stuck, and deformed by heat during control of the cleaning fluid and therefore they can maintain their sealing performance.

Herein, the valve body 20 is made of resin. Accordingly, when the fluid control valve 1 regulates a hot cleaning fluid of 200° C. to 250° C., the valve body 20 may cause creep deformation. The valve body 20 and the cylinder body 48 are fixed while the upper end portions 20*b* and the flange 31*f* are clamped and fixed by the fixing plates 50, 50 and the fixing screws 43. The valve body 20 and the cylinder body 48 are therefore clamped at small amounts by the fixing plates 50 and the fixing screws 43. Even when the valve body 20 is creep-deformed, therefore, this deformation is less likely to affect the fastening strength of the fixing screws 43. As a result, the fluid control valve 1 can maintain the holding force to retain the peripheral portion 25*c* of the diaphragm 25 between the valve body 20 and the cylinder body 48, thereby preventing leakage of the cleaning fluid flowing in the valve chamber 23 to the outside through the valve body 20 and the cylinder body 48.

On the other hand, the parts or members of the drive section 3 excepting the sealing members 40, 41, and 42 are made of metal having higher heat resistance than resin. The fixing plates 50, 50 are also made of metal having higher heat resistance than resin. Accordingly, the cylinder 31, cover 32, and fixing plates 50, 50 will not be deformed even when they are subjected to heat transfer from the valve body 20. Thus, the fixing screws 43 and 33 are not loosened during control of the hot cleaning fluid. This prevents the cylinder 31 and the cover 32 from becoming disassembled by the spring force of the spring 39.

In the fluid control valve 1 in the present embodiment, as explained above, for example a cleaning fluid of 200° C. to 250° C. is supplied to the valve section 2, the valve body 20 is heated by heat transfer from the cleaning fluid. The heat will be transferred from the valve body 20 to the cylinder body 48 having the constriction 31*a* provided to reduce the cross sectional area between the piston chamber 34 and the surface contacting the valve body 20. Thus, the heat is less transferred from the constriction 31*a* having a small cross sectional area to the portion surrounding the piston chamber 34 and less heats the sealing members 41 and 42 mounted on the sliding-contact surfaces of the piston 35 and the cylinder body 48. The purge air supplied to the air purge port 31*b* will flow from the fluid non-contact chamber 44 to the first chamber 34*a* through the passages 35*a* and 35*b* of the piston 35, and then flow out through the air exhaust port 32*a*. Even when the heat of the valve body 20 is transferred to the piston 35 via the diaphragm 25, therefore, the purge air cools the piston 35 from inside, restraining a temperature rise of the sealing members 41 and 42 mounted on the sliding-contact surfaces of the piston 35 and the cylinder body 48. As above, the fluid control valve 1 can restrain a temperature rise of the drive section 3, so that the internal parts or members of the cylinder body 48, e.g., the piston 35 and the sealing members 41, and 42, are hard to degrade.

Herein, if the cylinder body 48, piston 35, and others are made of resin such as PP (polypropylene) and PFA (Tetrafluoroethylene—perfluoroalkyl vinyl ether copolymer), the drive section 3 may be deformed by heat when the fluid control valve 1 controls a hot cleaning fluid of 200° C. to 250° C. If the cylinder body 48, piston 35, and others are made of PTFE exhibiting heat resistance, their strength is not strong. On the other hand, the fluid control valve 1 of the present embodiment in which the valve body 20 and the diaphragm 25 are made of resin and the cylinder body 48 is made of metal can provide high heat resistance and high strength as compared with the case where the cylinder body 48 is made of resin.

Figure 7:
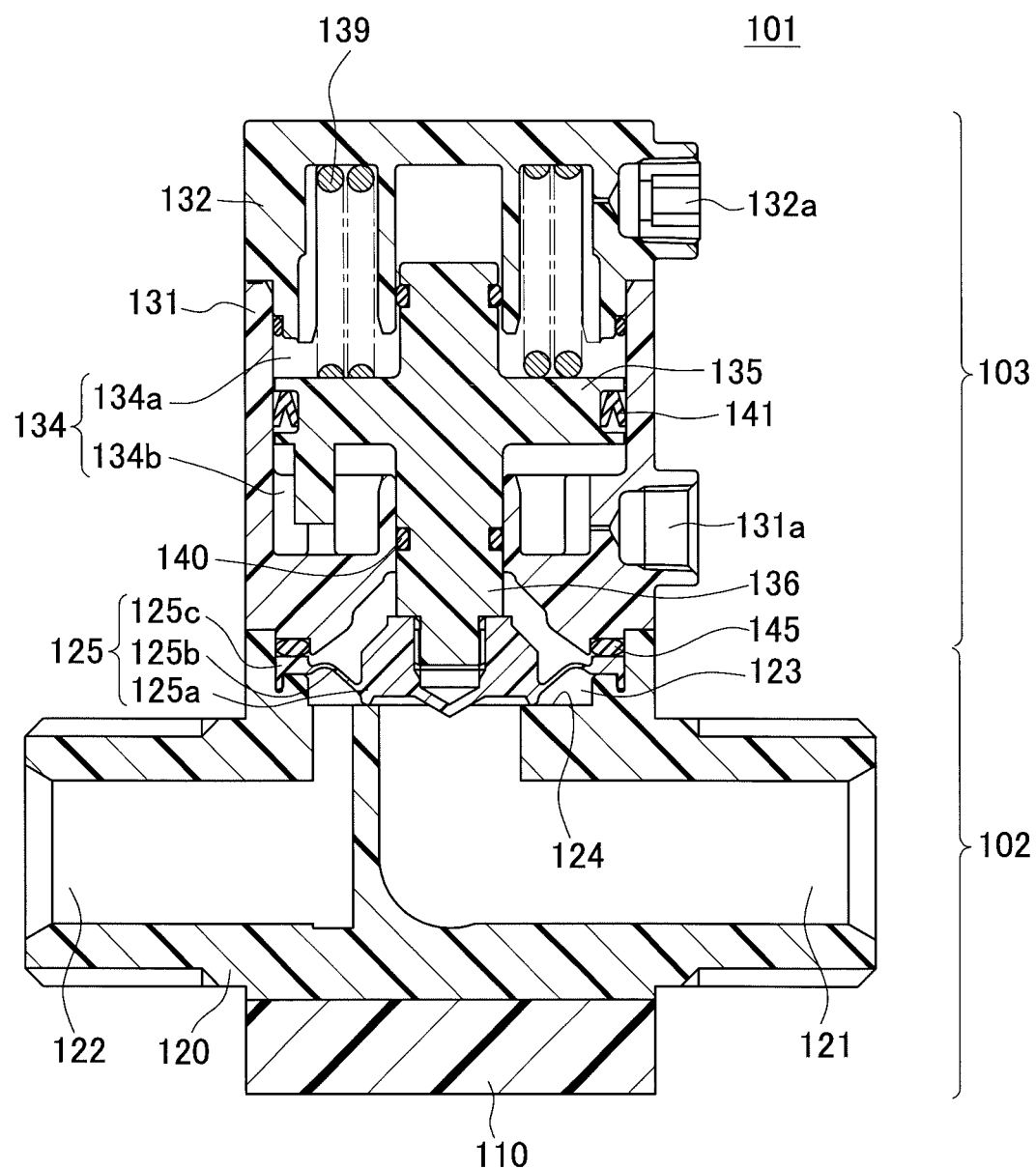
FIG. 7 is a cross sectional view of a conventional fluid control valve.
Figure 8:
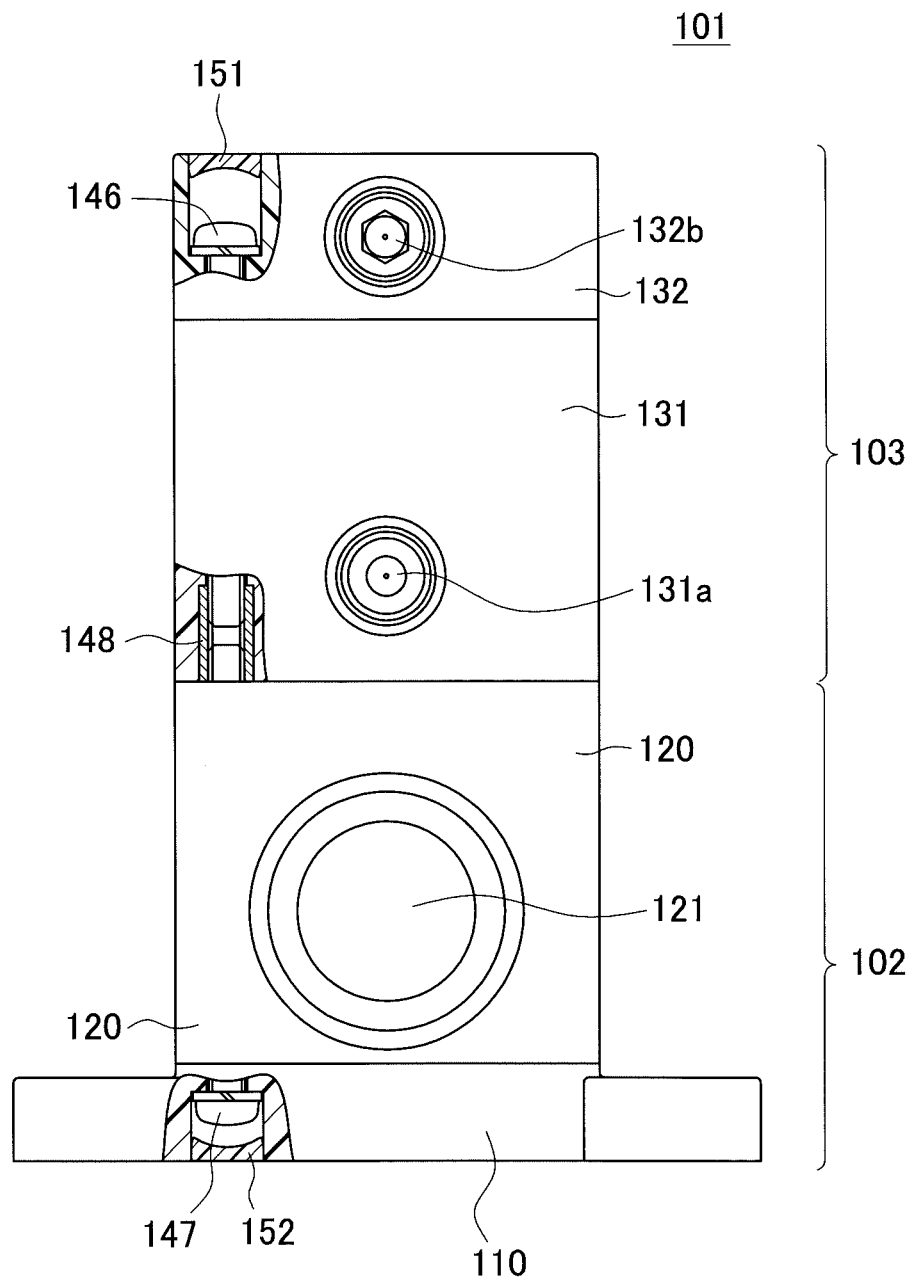
FIG. 8 is a view showing a fixing structure of the fluid control valve shown in FIG. 7.

For instance, in the conventional fluid control valve 101 shown in FIG. 8, the fixing screws 146 are inserted in the cylinder 131 from above the cover 132 and fastened with the nut members 148, while the fixing screws 147 are inserted through the valve body 120 from below the mounting plate 110 and fastened with the nut members 148. Accordingly, in the fluid control valve 101, all the cover 132, cylinder 131, valve body 120, and mounting plate 110 are clamped by and between the fixing screws 146 and 147. This clamping amount by the fixing screws 146 and 147 is long. In the above fluid control valve 101, if the valve body 120, cylinder 131, and others are creep-deformed, the fixing screws 146 and 147 are apt to be loosened. As the fixing screws 146 and 147 are loosened, the holding force to retain the diaphragm 125 shown in FIG. 7 is decreased, which may cause leakage of cleaning fluid from between the valve body 120 and the cylinder 131.

In the fluid control valve 1 of the present embodiment, on the other hand, the circular-arc fixing plates 50, 50 are placed on the outer periphery of the valve body 20 and the plurality of fixing screws 43 inserted through the cylinder body 48 are fastened with the female screw holes 50b, so that the fixing plates 50, 50 and the fixing screws 43 clamp and fix the valve body 20 and the cylinder body 48. Accordingly, the amount of clamping the valve body 20 and the cylinder body 48 by the fixing screws 43 and the fixing plates 50, 50 is small. This prevents the fixing screws 43 from becoming loose even when the valve body 20 is creep-deformed during control of the hot cleaning fluid of 200° C. to 250° C. Therefore, even if the valve body 20 is creep-deformed, the fluid control valve 1 can prevent the holding force to retain the peripheral portion 25c of the diaphragm 25 and thus is less likely to cause outward leakage of the fluid. Further, the cylinder 31 and the cover 32 each made of metal are not thermally deformed at a temperature of 200° C. to 250° C. In the fluid control valve 1, accordingly, the fixing screws 33 are not loosened during control of a hot cleaning fluid.

In the aforementioned fluid control valve 1, each fixing plate 50 includes the press portion 50c protruding toward the center. The valve body 20 is formed with the mounting groove 20a in which the press portions 50c are placed. The mounting groove 20a is designed to place the press portions 50c below the peripheral portion 25c of the diaphragm 25. When the fixing plates 50 and the fixing screws 43 clamp and fix the valve body 20 and the cylinder body 48, accordingly, the press portions 50c press the valve body 20 against the cylinder body 48 from below the peripheral portion 25c of the diaphragm 25, compressing the peripheral portion 25c of the diaphragm 25 to provide sealing. This can prevent outward leakage of cleaning fluid.

In the fluid control valve of the present embodiment, the valve body 20 is formed with the rotation-lock holes 26 in the positions corresponding to the female screw holes 50b of the fixing plates 50 so that the leading end of each fixing screw 43 is inserted in corresponding one of the holes 26. Accordingly, even if the cylinder body 48 attempts to rotate with respect to the valve body 20 due to vibrations of surrounding environments, this rotation is inhibited. The aforementioned fluid control valve 1 can thus prevent rotation of the cylinder body 48 with respect to the valve body 20 and does not decrease the holding force to retain the diaphragm 25.

Figure 9:
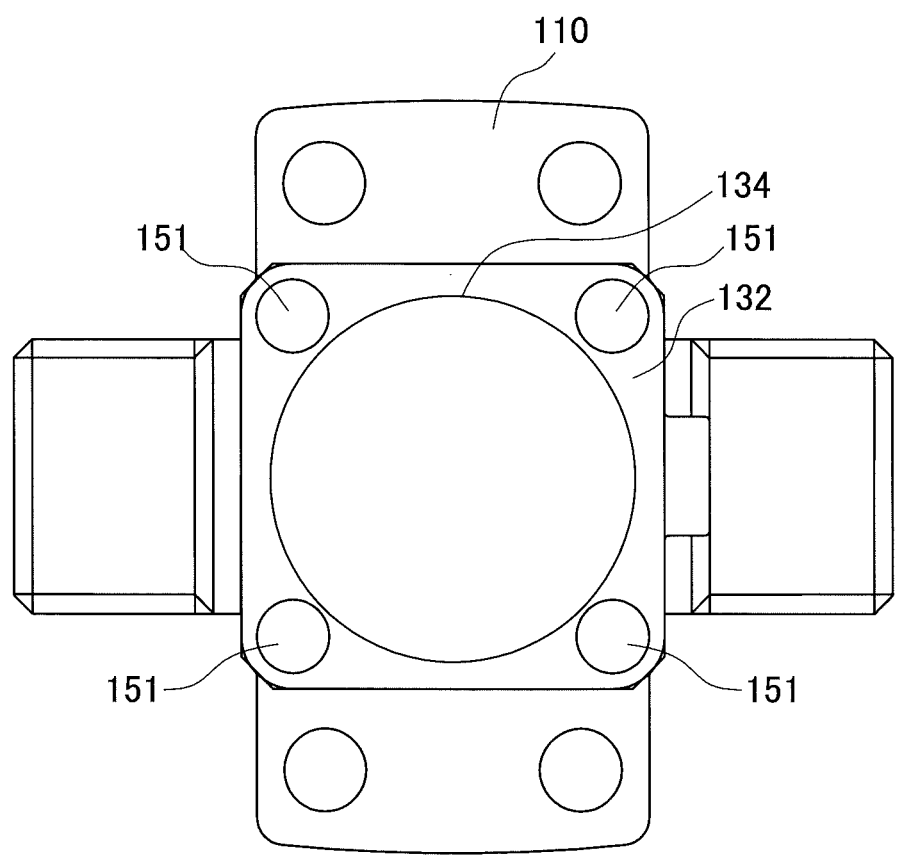
FIG. 9 is a top view of the fluid control valve shown in FIG. 7.

In the conventional fluid control valve 101, as shown in FIG. 9, the cylinder (cylinder 131 and cover 132) and the valve body 120 are each formed in a rectangular parallelepiped shape. Accordingly, in a case where the fixing screws 146 and 147 are fastened as shown in FIG. 8, the wall thickness of the portions around the fixing screws 146 and 147 is not uniform. Consequently, when the valve body 120 and the cylinder 131 are creep-deformed, stress is liable to concentrate on the portions around the fixing screws 146 and 147, leading to loosening of the fixing screws 146 and 147. As the fixing screws 146 and 147 are loosened, the holding force to retain the diaphragm 125 becomes nonuniform. This may cause defects such as leakage of a cleaning fluid from between the valve body 120 and the cylinder 131.

On the other hand, in the fluid control valve 1 of the present embodiment, a portion (the flange 31f) of the cylinder body 48 clamped by the fixing plates 50 has a circular columnar shape and a portion of the valve body 20 clamped by the fixing plates 50 has a circular columnar shape or a regular polygonal, e.g., hexagonal or more, shape. Accordingly, the cylinder body 48 and the valve body 20 are approximately uniform in wall thickness around each fixing screw 43. In the fluid control valve 1 of the present embodiment, accordingly, there is no stress is concentrated at around the fixing screws 43 even when the valve body 20 is creep-deformed. During control of a hot cleaning fluid, therefore, the fluid control valve 1 can hold the peripheral portion 25c of the diaphragm 25 with circumferentially uniform force. This can prevent leakage of the cleaning fluid.

In the aforementioned fluid control valve 1, the area of the surface of the valve body 20 contacting with the cylinder body 48 is smaller than the projected area of the lower surface of the cylinder body 48. The mounting groove 20a is provided so that a gap is generated between the fixing plates 50 and at least one of the cylinder body 48 and the valve body 20 while at least the press portions 50c of the fixing plates 50 are placed in contact with the valve body 20. In the thus configured fluid control valve 1, an air layer providing low heat-transfer efficiency is provided between the valve body 20 and the cylinder body 48 and also the heat is transferred from the valve body 20 to the cylinder body 48 through a smaller area than the projected area of the cylinder body 48. Thus, the temperature of the cylinder body 48 is less likely to increase by the heat of the valve body 20.

In the above fluid control valve 1, the heat insulation members 55 are placed in the gaps formed between the fixing plates 50 and the valve body 20 and the cylinder body 48, This makes it more difficult to transfer heat from the valve body 20 to the cylinder body 48.

The present invention is not limited to the aforementioned embodiment and may be embodied in other specific forms without departing from the essential characteristics thereof.

Although the above embodiment shows that the parts or members of the drive section 3 are made of metal, for instance, they may be made of resin to reduce their weights.

In the above embodiment, the outer shape of the valve body 20 is regular octagonal. As alternatives, the shape of the valve body 20 may be a circular columnar shape, a regular hexagonal shape, a regular heptagonal shape, or a nonagonal or more regular polygonal shape. In this case, it is further possible to uniformize the stress generated in the valve body 20 under thermal deformation.

In the above embodiment, the air purge port 31b and the operation port 31c are connected to the operation air supply source to utilize the same fluid as the operation air for the purge air. Alternatively, a fluid different from the operation air may be utilized as the purge air and supplied to the air purge port 31b. In this case, when the pressure of the purge air to be supplied from a purge air supply source is lower than the pressure of the high-pressure operation air to be supplied from the operation air supply source, the regulator for pressure reduction is eliminated from a line connected to the air purge port 31b. This can provide a compact pipe arrangement of the line connected to the fluid control valve 1.

In the above embodiment, the piston rod 35c is integrally formed with the piston 35. As an alternative, a piston and a piston rod may be provided separately and coupled to each other.

In the above embodiment, two semi-circular fixing plates 50 are used to couple the cylinder body 48 and the valve body 20. As an alternative, three or more fixing plates each having a crescent shape may be used to couple the cylinder body 48 and the valve body 20.

Although the fluid control valve 1 in the above embodiment is used for control of chemical solutions such as a cleaning fluid, it may be used for control of other hot fluids.

In the above embodiment, the gaps are provided between the upper surfaces of the fixing plates 50 and the cylinder body 48 and between the lower surfaces of the fixing plates 50 and the valve body 20. As an alternative, either one may be placed in contact with each other. Even in this case, the presence of the remaining gap makes it difficult to transfer heat from the valve body 20 to the cylinder body 48. It is also preferable to place the heat insulation material 55 in that gap to enhance a heat insulating effect.

In the above embodiment, the heat insulation members 55 are placed in only the gaps formed in a horizontal direction between the fixing plates 50 and the valve body 20 and between the fixing plates 50 and the cylinder body 48. The heat insulation members 55 also may be placed in a gap formed in a vertical direction between the inner peripheral surface of the fixing plates 50 and the valve body 20.

Furthermore, the heat insulation members 55 may be provided to fill the gaps formed between the fixing plates 50 and the valve body 20 and the cylinder body 48.

REFERENCE SIGNS LIST

1 Fluid control valve
2 Valve section
3 Drive section
20 Valve body
20a Mounting groove
21 First port
22 Second port
24 Valve seat face (one example of Valve seat)
25 Diaphragm
25c Peripheral portion
26 Rotation-lock hole
31a Constriction
31b Air purge port
31c Operation port
32a Air exhaust port
34 Piston chamber
34a First chamber
34b Second chamber
35 Piston
35a Main purge passage (One example of Passage)
35b Communication passage (One example of Passage)
41 Sealing member
43 Fixing screw
48 Cylinder body
50 Fixing plate
50b Female screw hole
50c Press portion
55 Heat insulation member

The invention claimed is:

1. A fluid control valve including a valve section for controlling fluid and a drive section for imparting a drive force to the valve section, wherein
the valve section includes:
a valve body formed with a first port and a second port;
a valve seat provided between the first port and the second port; and
a diaphragm movable into or out of contact with the valve seat, the drive section includes:
a cylinder body provided with a piston chamber and clamping the diaphragm with respect to the valve body;
a piston slidably mounted in the piston chamber to divide the piston chamber into a first chamber and a second chamber and connected to the diaphragm; and
a rubber sealing member mounted on sliding-contact surfaces of the piston and the cylinder body,
the cylinder body includes a constriction to reduce a cross sectional area of a portion between the piston chamber and a surface contacting the valve body,
the cylinder body is formed with an air exhaust port communicating with the first chamber, an operation port communicating with the second chamber to supply operation air to the second chamber, and a purge port communicating with a fluid non-contact chamber on the diaphragm to supply purge gas to the fluid non-contact chamber, and
the piston is formed with a flow passage to communicate the fluid non-contact chamber and the first chamber.

2. The fluid control valve according to claim 1, wherein the valve body and the diaphragm are made of resin, and the cylinder body is made of metal.

3. The fluid control valve according to claim 2, further including:
a plurality of fixing screws inserted through the cylinder body; and
a circular-arc shaped fixing plate provided with female screw holes arranged evenly in a circumferential direction, in which the plurality of fixing screws are fastened,
wherein the fixing plate is placed on an outer circumference of the valve body and the plurality of fixing screws inserted through the cylinder body are fastened with the female screw holes, and the valve body and the cylinder body are clamped by the fixing plate and the plurality of fixing screws.

4. The fluid control valve according to claim 3, wherein the fixing plate includes a press portion protruding toward a center,
the valve body is formed with a mounting groove in which the press portion is placed, and
the mounting groove is formed so that the press portion is placed below a peripheral portion of the diaphragm.

5. The fluid control valve according to claim 4, wherein the valve body has a surface contacting with the cylinder body and having an area smaller than a projected area of a lower surface of the cylinder body, and
the mounting groove is provided so that a gap is formed between the fixing plate and at least one of the cylinder body and the valve body while at least the press portion of the fixing plate is placed in contact with the valve body.

6. The fluid control valve according to claim 5, further including a heat insulation member placed in the gap.

7. The fluid control valve according to claim 4, wherein the valve body is formed with rotation-lock holes in positions corresponding to the female screw holes, and leading ends of the plurality of fixing screws are inserted in the rotation-lock holes.

8. The fluid control valve according to claim 3, wherein the valve body is formed with rotation-lock holes in positions corresponding to the female screw holes, and leading ends of the plurality of fixing screws are inserted in the rotation-lock holes.

9. The fluid control valve according to claim 3, wherein
a portion of the cylinder body clamped by the fixing plate and the plurality of fixing screws has a circular columnar shape, and
a portion of the valve body clamped by the fixing plate and the fixing screws has a circular columnar shape or a regular polygonal or more polygonal shape.

10. The fluid control valve according to claim 1, further including:
a plurality of fixing screws inserted through the cylinder body; and
a circular-arc shaped fixing plate provided with female screw holes arranged evenly in a circumferential direction, in which the plurality of fixing screws are fastened,
wherein the fixing plate is placed on an outer circumference of the valve body and the plurality of fixing screws inserted through the cylinder body are fastened with the female screw holes, and the valve body and the cylinder body are clamped by the fixing plate and the plurality of fixing screws.

11. The fluid control valve according to claim 10, wherein the fixing plate includes a press portion protruding toward a center,
the valve body is formed with a mounting groove in which the press portion is placed, and
the mounting groove is formed so that the press portion is placed below a peripheral portion of the diaphragm.

12. The fluid control valve according to claim 11, wherein
the valve body has a surface contacting with the cylinder body and having an area smaller than a projected area of a lower surface of the cylinder body, and
the mounting groove is provided so that a gap is formed between the fixing plate and at least one of the cylinder body and the valve body while at least the press portion of the fixing plate is placed in contact with the valve body.

13. The fluid control valve according to claim 12, further including a heat insulation member placed in the gap.

14. The fluid control valve according to claim 11, wherein the valve body is formed with rotation-lock holes in positions corresponding to the female screw holes, and leading ends of the plurality of fixing screws are inserted in the rotation-lock holes.

15. The fluid control valve according to claim 11, wherein
a portion of the cylinder body clamped by the fixing plate and the plurality of fixing screws has a circular columnar shape, and
a portion of the valve body clamped by the fixing plate and the fixing screws has a circular columnar shape or a regular polygonal or more polygonal shape.

16. The fluid control valve according to claim 10, wherein the valve body is formed with rotation-lock holes in positions corresponding to the female screw holes, and leading ends of the plurality of fixing screws are inserted in the rotation-lock holes.

17. The fluid control valve according to claim 16, wherein
a portion of the cylinder body clamped by the fixing plate and the plurality of fixing screws has a circular columnar shape, and
a portion of the valve body clamped by the fixing plate and the fixing screws has a circular columnar shape or a regular polygonal or more polygonal shape.

18. The fluid control valve according to claim 16, wherein
the valve body has a surface contacting with the cylinder body and having an area smaller than a projected area of a lower surface of the cylinder body, and
the mounting groove is provided so that a gap is formed between the fixing plate and at least one of the cylinder body and the valve body while at least the press portion of the fixing plate is placed in contact with the valve body.

19. The fluid control valve according to claim 10, wherein
a portion of the cylinder body clamped by the fixing plate and the plurality of fixing screws has a circular columnar shape, and
a portion of the valve body clamped by the fixing plate and the fixing screws has a circular columnar shape or a regular polygonal or more polygonal shape.

20. The fluid control valve according to claim 19, wherein
the valve body has a surface contacting with the cylinder body and having an area smaller than a projected area of a lower surface of the cylinder body, and
the mounting groove is provided so that a gap is formed between the fixing plate and at least one of the cylinder body and the valve body while at least the press portion of the fixing plate is placed in contact with the valve body.

* * * * *